(No Model.)
N. C. BOYNTON.
ANIMAL TRAP.
No. 355,857. Patented Jan. 11, 1887.
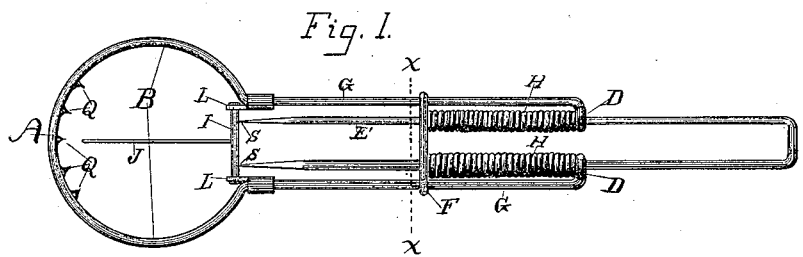
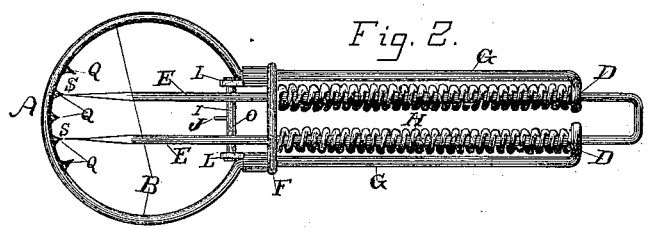
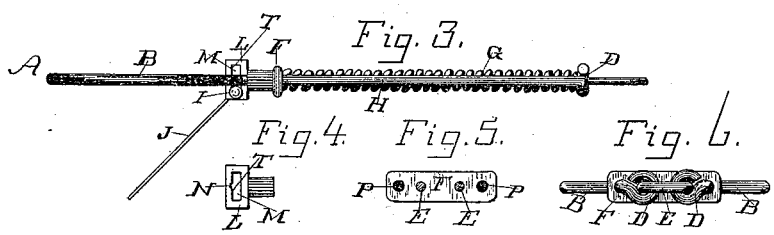
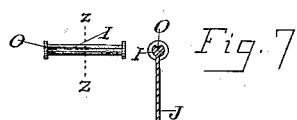
Witnesses.
J. Downey Harvey
J. J. McCarthy
Inventor.
Nelson C. Boynton
by
Hazard & Townsend
his Attys.

UNITED STATES PATENT OFFICE.

NELSON C. BOYNTON, OF LOS ANGELES, CALIFORNIA.

ANIMAL-TRAP.

SPECIFICATION forming part of Letters Patent No. 355,857, dated January 11, 1887.

Application filed April 12, 1886. Serial No. 198,600. (No model.)

*To all whom it may concern:*

Be it known that I, NELSON CAMBRIDGE BOYNTON, a citizen of the United States, residing at Los Angeles, in the county of Los Angeles and State of California, have invented a new and useful Improvement in Animal-Traps, of which the following is a specification.

The object of my invention is to devise a simple and cheaply-constructed trap which will be efficient in destroying animals as they pass along their run or go in or out of their burrows or holes. I accomplish this object by means of the device described herein and illustrated in the accompanying drawings, in which—

Figure 1 shows the trap as it appears when set. Fig. 2 shows the trap as it appears when sprung. Fig. 3 is a side view of the trap when sprung. Fig. 4 is a slotted frame in which the trencher is mounted. Fig. 5 is a cross-section on line $x\ x$, Fig. 1, the frame-wire being removed. Fig. 6 is an end view. Fig. 7 illustrates the device which retains and releases the spears.

A is the frame-wire bent into a circle, B, at the middle and formed at the ends into two loops, D D, through which the prongs of a spear, E E, play freely back and forth.

F is a brace, to which the spear is fixedly attached. Two holes, P, are provided in this brace, through which the straight arms G of the frame pass, playing freely therein. A spiral spring, H, is mounted around each prong of the spear, between the brace F and the looped ends D of the frame, so that the tendency of the springs is to drive the spear forward into the circle B. A roller or bar, I, provided with a trigger, J, is mounted within the circle B by means of two slotted frames, L, which support the ends of the roller. The slots M in the frames L extend at right angles to the axis of the spear, and also at right angles to the axis of the roller, and a slight notch, N, in the supporting-face T of each, in the middle thereof, serves to retain the roller in position to intersect the ends of the prongs when the trap is set, as shown in Fig. 1.

On the roller opposite to the trigger I provide a longitudinal groove, O, which receives the points of the prongs and prevents them from slipping off of the roller.

Barbs Q are mounted on the inside of the circle, against which the neck of the animal will be pressed by the spear.

The operation of the trap is obvious. To set it, the spear is drawn back, the roller is pushed into the notches N, the trigger J is extended across the circle, and the points S of the spear are allowed to enter the groove O. The circle is then so placed as to surround the runway of the animal or the mouth of its hole or burrow. This causes the trigger to extend across the path in which the animal will pass. When the animal pushes the trigger from either side far enough to roll the bar I sufficiently to bring the points of the spear against the sides of the groove O, the bar will be forced aside out of the notches N, and thus release the spear, which will be driven through the animal by the coiled springs.

The roller or bar I may be angular, if desired; but I believe the shape shown in the drawings to be the best form.

Some degree of service would be performed were the notches N and the groove O dispensed with; but the trap would be liable to be sprung before the head of the animal would enter sufficiently to receive the spear-points.

Various modifications of my invention can be easily devised; but the essential feature is the trigger and roller mounted in the path of the point of the spear in such a manner that when the trigger is moved sufficiently in either direction the roller will move out of the way of the spears and allow them to pass. This feature allows the passageway into the burrow or along the run of the animal to be comparatively clear, and allows the animal to spring the trap when passing in either direction.

I am aware that animal-traps have heretofore been constructed in which spring-impelled spears have been combined with a frame and a trigger in such a manner that when the animal passed through the ring at the end of the frame he would move the trigger and release the spears, which would pierce the amimal. Such a device is shown in patent to C. Jillson, No. 16,335, of January 6, 1857; and I do not broadly claim such a device as a part of my invention. I am not aware, however, that in any animal-trap heretofore made there has ever been used any device for retaining and releasing the spears which corresponds to the trencher I J, mounted in the path of the spear-points upon the supporting-faces T.

Now, having described my invention, what I claim as new, and desire to secure by Letters Patent, is—

1. In an animal-trap substantially such as described, the device set forth for retaining and releasing the spears, consisting of the trigger J, attached to the bar I, which extends across the path of the spear-points and is supported at the ends upon faces T, situated upon opposite sides of and extending approximately at right angles to the path of the spear and the axis of the bar I.

2. The combination of the spear E S, frame B G D, springs H, brace F, bar I, trigger J, groove O, frames L L, provided with slots M M, and notches N.

3. In an animal-trap substantially such as described, the combination, as set forth, of the frame of the trap, the longitudinally-reciprocating spring-pressed spears mounted therein, substantially as set forth, the bar I, trigger J, and frames L L, provided with slots M.

4. In an animal trap substantially such as described, the combination, as set forth, of the spears E S, frame B G D, springs H, brace F, bar I, trigger J, and frames L, provided with slots M.

NELSON C. BOYNTON.

Witnesses:
  H. T. HAZARD,
  JAS. R. TOWNSEND.